United States Patent
Murphy

(10) Patent No.: US 7,976,254 B2
(45) Date of Patent: Jul. 12, 2011

(54) SYSTEM FOR SECURING A PERSONAL VEHICLE

(75) Inventor: Charles Murphy, Crestline, CA (US)

(73) Assignee: Moto Cinch, Inc., Newport Beach, CA (US)

( * ) Notice: Subject to any disclaimer, the term of this patent is extended or adjusted under 35 U.S.C. 154(b) by 930 days.

(21) Appl. No.: 11/678,545

(22) Filed: Feb. 23, 2007

(65) Prior Publication Data

US 2008/0124183 A1    May 29, 2008

Related U.S. Application Data

(60) Provisional application No. 60/776,515, filed on Feb. 24, 2006.

(51) Int. Cl.
*B60P 7/08* (2006.01)

(52) U.S. Cl. .................................. 410/3; 410/7; 410/19

(58) Field of Classification Search ................ 410/3, 4, 410/7, 9, 19, 22, 80; 224/403, 568, 570, 224/924, 552, 42.38, 558, 42.4, 546, 553; 248/500, 503
See application file for complete search history.

(56) References Cited

U.S. PATENT DOCUMENTS

| | | | |
|---|---|---|---|
| 3,591,029 A | 7/1971 | Coffey | |
| 3,753,579 A | 8/1973 | Kurilich, Jr. | |
| 3,778,087 A | 12/1973 | Kallenbach | |
| 4,662,617 A | 5/1987 | Ditterline, Jr. et al. | |
| 6,109,494 A | 8/2000 | Pilmore | |
| 6,705,596 B2 | 3/2004 | Reinikka et al. | |
| 6,761,519 B2 * | 7/2004 | Alderman | 410/3 |
| 2005/0199561 A1 | 9/2005 | Dansie et al. | |
| 2006/0159541 A1 | 7/2006 | Fullenkamp | |
| 2006/0171790 A1 | 8/2006 | Macomber, III | |
| 2006/0257223 A1 | 11/2006 | Saldana | |

* cited by examiner

*Primary Examiner* — Stephen Gordon
(74) *Attorney, Agent, or Firm* — Eric Karich

(57) ABSTRACT

A securing device for motorcycles and ATVs. The securing device comprises an anchor member that is detachably mounted to a floor of a transport vehicle and a coupling sleeve that engages with the footpeg of the motorcycle. A lever assembly is interposed between the coupling sleeve and the anchor member so movement of the lever member between a secured and release position results in the motorcycle or ATV being urged towards or away from the floor of the transport vehicle.

4 Claims, 8 Drawing Sheets

SYSTEM FOR SECURING A PERSONAL VEHICLE

RELATED APPLICATIONS

This application claims the benefit of U.S. Provisional Patent Application No. 60/776,515 filed Feb. 24, 2006, which is hereby incorporated by reference in its entirety herein.

BACKGROUND OF THE INVENTION

1. Field of the Invention

The present invention relates to a personal vehicle accessory and, in particular, concerns a system for securing a motorcycle or all terrain vehicle (ATV), such as a quad or three-wheeler, for transport by a vehicle such as a pick-up truck or trailer.

2. Description of the Related Art

Recreational motorized vehicle riding is a very popular sport. Oftentimes, motorcycles or ATVs are transported in the backs of pick-up trucks or on trailers from a residence to the place where the recreational riding is to occur. This is particularly common for off-road-type motorcycles and ATVs which are not street legal and are generally transported a considerable distance to the riding location.

As the motorcycles and ATVs are often transported over very rough terrain, it is important to be able to adequately secure the vehicle in the transport vehicle so that the vehicle does not become dislodged or move about. If the vehicle is allowed to move about, it may be damaged or it may damage other equipment being transported or even the transport vehicle.

To secure motorcycles and ATVs typically tie-down straps are used. These straps attach between portions of the frame of the motorcycle or ATV and mounting locations within the transport vehicle. One common way to secure motorcycles or ATVs into a truck or trailer is to attach tie-down straps to the handlebars and then to a securing place adjacent the floor of the truck or trailer. The tie-down strap is then cinched down until the front shock absorbers of the vehicle are compressed. Similarly, tie-down straps are often also used to cinch down the back portion of the vehicle as well. In this way, the motorcycle or ATV is inhibited from further movement.

Securing motorcycles or ATVs using commonly available tie-down straps is both time consuming and, at times, less effective. Multiple straps must be used to secure the motorcycle or ATV often in the close confine of a truckbed or trailer that is already occupied by other vehicles or equipment. Attaching and tightening these tie-downs, in this environment is often difficult. Moreover, as the straps can be difficult to adequately tighten and also often have to be routed over other equipment, the motorcycle or ATV occasionally will not be adequately tied down. This requires subsequent adjustment of the tie-down straps which typically requires the vehicle transporting the motorcycle or ATV to stop. Inadequate securement by the tie-down straps can also result in the motorcycle or ATV becoming partially or fully dislodged thereby increasing the likelihood of damage to either the motorcycle or ATV or to surrounding equipment or the transport vehicle.

A further difficulty associated with tie-downs is that they extend into spaces where equipment could otherwise be stored. The tie-downs generally extend laterally across the truck bed or trailer floor which inhibits access to that space and limits the ability of a person to move in that space or store additional equipment.

From the foregoing, it should be apparent that there is a need for a securing system for personal motorized vehicles, such as motorcycles or ATVs, that is more effective at securing the motorcycle within the trailer and is also easier to use. To this end, a simpler securing system that does not incorporate straps that have to be routed over other equipment is needed.

SUMMARY OF THE INVENTION

The aforementioned needs are satisfied by the personal vehicle securing system of the present invention which, in one embodiment, comprise a leg member that is mounted to the floor of the vehicle transporting the motorcycle or ATV and a securing assembly that is movably mounted to the leg member and couples with the foot peg of the personal vehicle. The securing assembly, in one implementation, is preferably movable with respect to the leg member between a secured position and a release position. The securing assembly in the secured position urges the footpeg of the personal vehicle downward thereby compressing the shock absorber of the vehicle to thereby inhibit movement of the personal vehicle with respect to the floor of the transport vehicle. In a release position, the securing assembly is elevated away from the floor of the vehicle transporting the motorcycle or ATV thereby allowing the motorcycle or ATV shock absorber to be decompressed such that the securing assembly can be removed from the footpeg thereby allowing the motorcycle or ATV to be removed from the vehicle.

In one particular implementation, the securing assembly comprises a lever member that has a handle that is pivotably attached to the leg member. Similarly, the securing assembly includes a boot or sleeve that is sized to receive the footpeg and an arm member which is pivotally attached to the lever member and is also attached to the boot or sleeve. In one particular implementation, a locking assembly, such as a securing chain or pin or strap, is also included. The locking assembly is attached between a handle portion of the lever member and the boot or sleeve as it is positioned over the footpeg. In one particular implementation, the pin is inserted through an opening in the boot or sleeve and through an opening in the footpeg so as to inhibit the footpeg from sliding out of the boot or sleeve. In one particular embodiment, a chain is attached to the pin and the lever member and is sized to have a length which inhibits the lever from moving from the secured position into the release position when the pin is engaged with the boot or sleeve.

It will be understood that in many applications, two of the aforementioned motorcycle or ATV securing assemblies, one for each footpeg, are used to secure a motorcycle or ATV to the floor of the transport vehicle. It will also be appreciated that this particular securing assembly can be used in conjunction with any of a number of vehicles that are adapted for transporting motorcycles or ATVs, including pick-up trucks and trailers. The securing device thus permits vehicles to be secured with two compact securing mechanisms that are located on the floor of the vehicle. This leaves more space in the vehicle to be used for transporting other items. Further, the motorcycles or ATVs can be secured in an easier and quicker manner.

These and other objects and advantages of the present invention will become more apparent from the following description taken in conjunction with the accompanying drawings.

DETAILED DESCRIPTION OF THE PREFERRED EMBODIMENT

Figure 1:
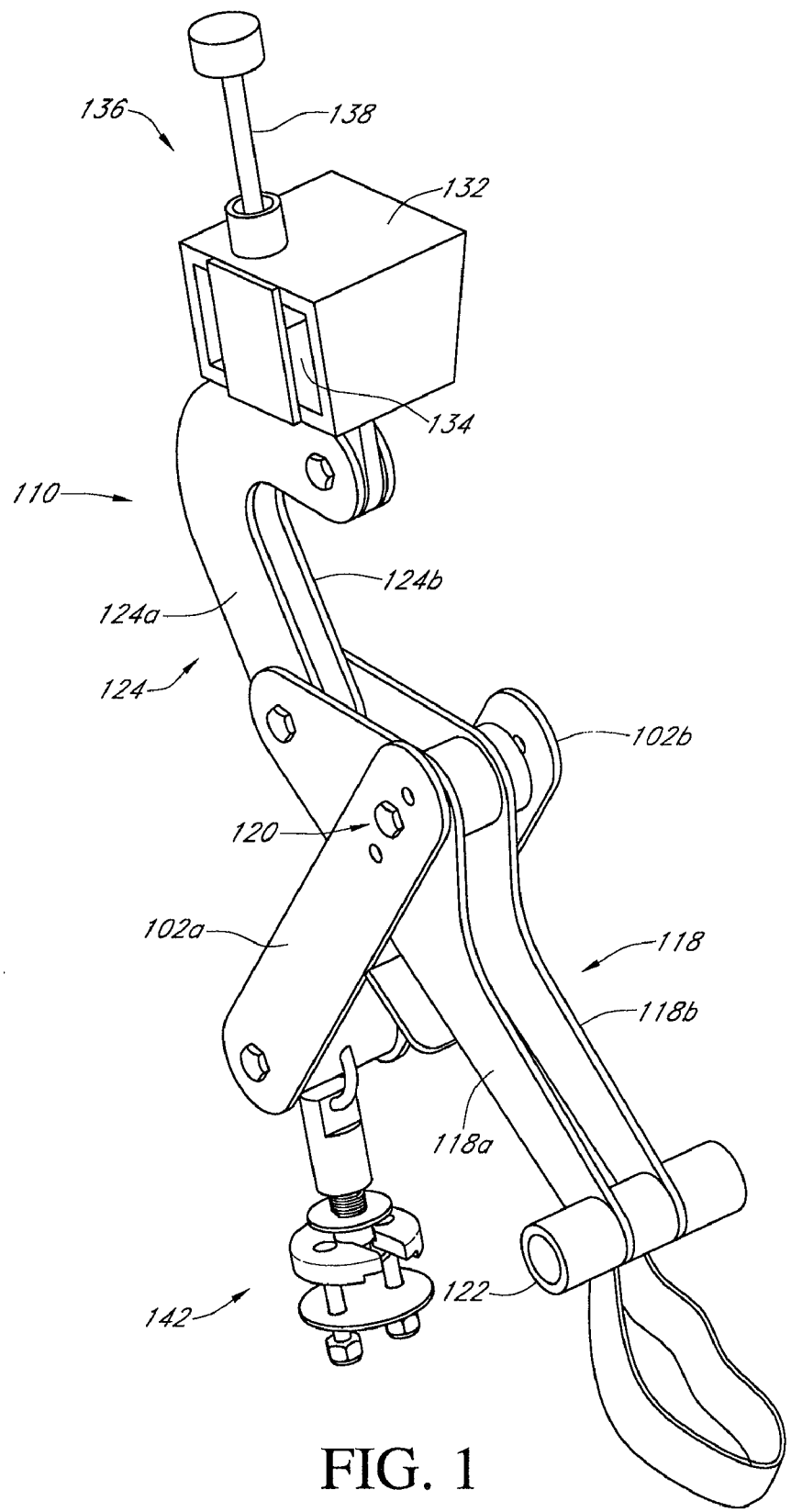
FIG. 1 is a perspective view of one exemplary embodiment of a personal motorized vehicle securing device.
Figure 2:
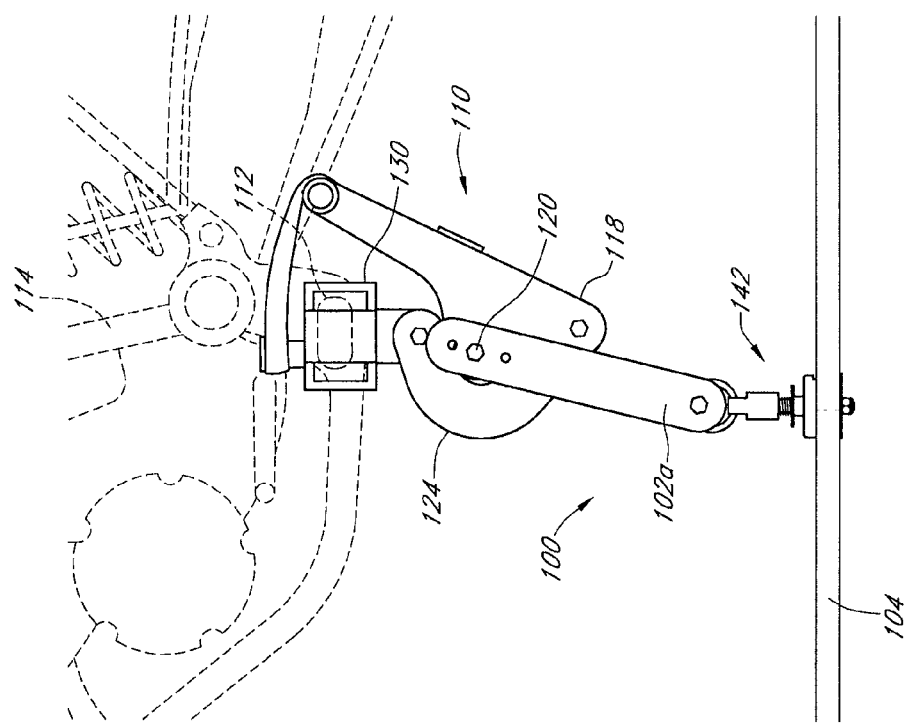
FIG. 2 is a side view of the personal motorized vehicle securing device of FIG. 1.

Reference will now be made to the drawings wherein like numerals refer to like parts throughout. As is illustrated in FIGS. 1 and 2, the personal motorized vehicle securing apparatus 100 includes a leg member 102 which, in this particular embodiment, is comprised of two spaced apart members 102a, 102b (FIG. 1) that are bolted or otherwise secured together so as to form the leg member 102. The leg member 102 is preferably pivotally attached via an anchor assembly 142 to a floor of the vehicle transporting the personal motorized vehicle so as to allow pivotal motion of the leg member 102 in both a back and forth and lateral fashion. The anchor member 142 will be described in greater detail in connection with FIG. 3 hereinbelow.

The assembly 100 further includes a securing assembly 110 that couples between the leg member 102 and a footpeg 112 of a personal motorized vehicle 114, which can include a motorcycle, quad or ATV, in a pivotal fashion. In one particular implementation, the securing assembly 110 comprises a lever member 118 that is pivotally attached to the leg member 102 about a pivot point 120. The pivot point 120 is preferably located between the ends of the lever member 118. As shown in FIG. 1, the lever member 118 is formed of two members 118a, 118b that are bolted or otherwise secured together. The lever member 118 preferably includes a handle 122 at a first end that extends outwardly from the plane of the lever member 118 to thereby facilitate a user from moving the securing assembly 110 from the release position shown in FIG. 4A to the secure position shown in FIG. 4B and vice-versa.

The lever member 118, at a second end opposite the handle 122, is pivotally attached to a first end of an arm member 124 that, in this particular embodiment, is generally "C" shaped. The arm member 124 is formed of two spaced apart members 124a, 124b that are bolted or otherwise secured together. The pivoting attachment between the lever member 118 and the arm member 124 allows the arm member 124 to be drawn downward when the lever member 118 is positioned from the release position into the secured position. Further, the pivoting attachment allows the user to move the arm member 124 laterally, e.g., inward and outward from the personal motorized vehicle, when the assembly is in the release position to allow for easier installation on the footpegs of the vehicle in the manner that will be described in greater detail below.

A boot or sleeve 130 is pivotally attached to the arm member 124 at a second end of the arm member 124 and is preferably sized to receive the footpeg 112 of the motorcycle. The sleeve 130 is preferably sized and shaped so as to receive a standard footpeg 112. As is also illustrated in FIG. 1, the sleeve includes a pin assembly 136 on an upper surface 132 of the sleeve 130. The pin assembly 136 includes a pin 138 that extends through the opening 134 defined by the sleeve 130 that is sized to receive the footpeg 112. The pin 138 is preferably movable such that the pin 138 can be positioned through the opening 134 and through an opening in the footpeg 112 so as to secure the sleeve 130 to the footpeg 112.

Figure 4A:
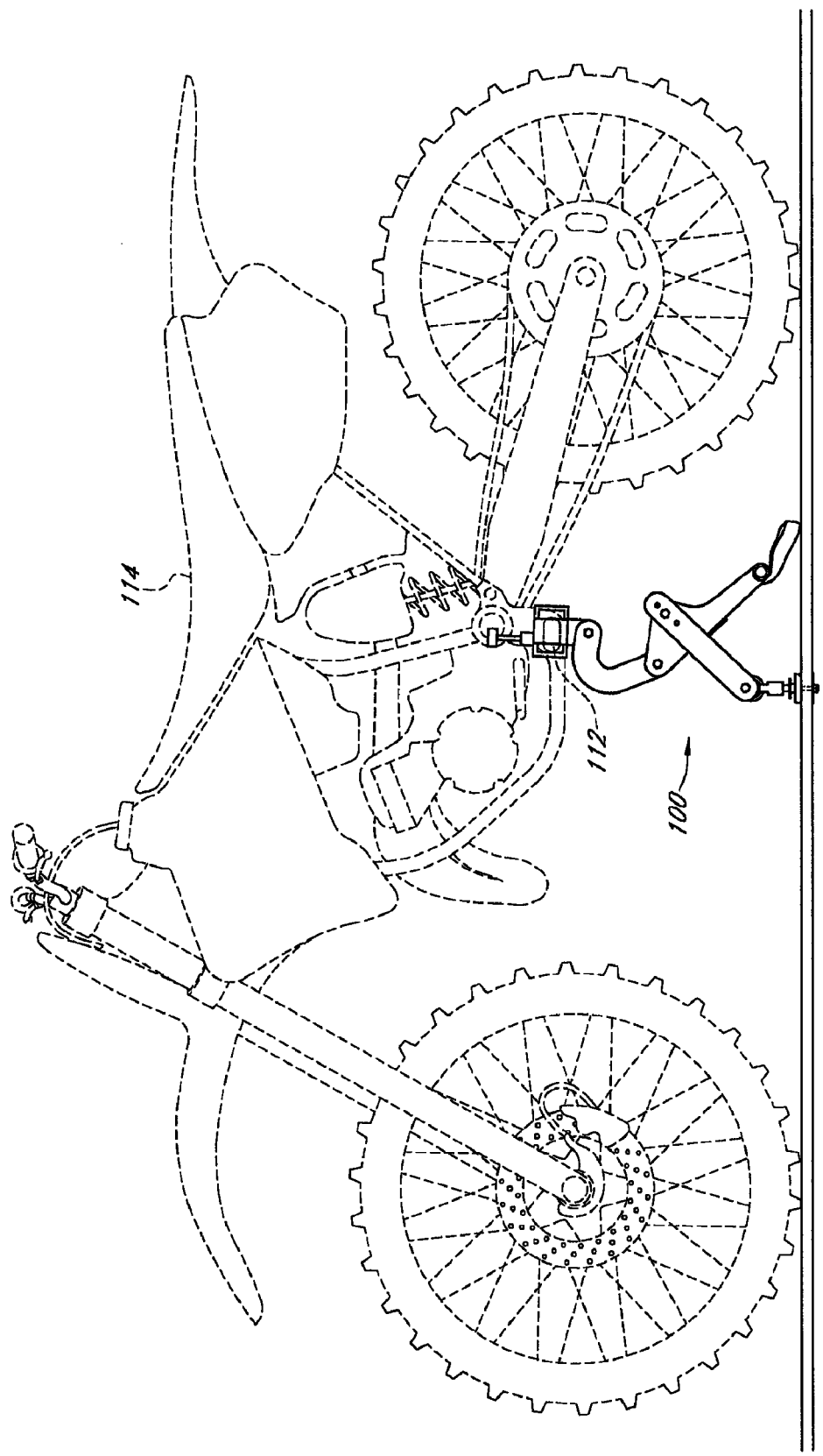
FIGS. 4A and 4B are side views of the securing device of FIG. 1 in a secured and unsecured position respectively.
Figure 4B:
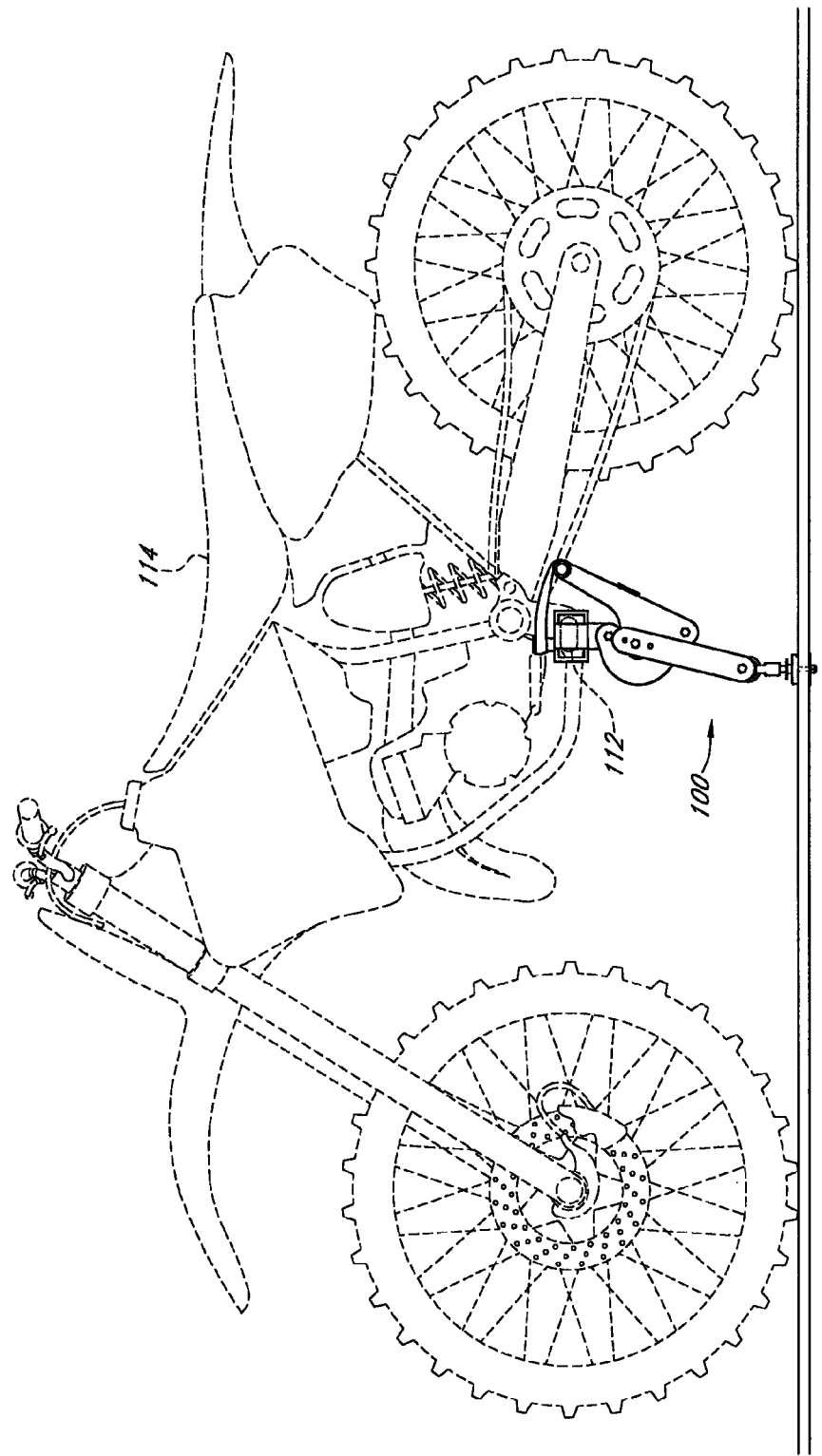

Further, the pin 138 can be attached to the handle 122 via a strap 140 so as to inhibit the lever member 118 from moving from the secured position shown in FIG. 4A to the release position shown in FIG. 4B during transportation of the personal motorized vehicle. Further, the pin 138 may be attached to the sleeve 130 via a cable or the like. The pin 138 may also have a ball connector that engages with an opening in the bottom surface of the sleeve to inhibit the pin 138 from disengaging from the sleeve 130 and footpeg 112 during transport of the motorcycle or ATV. In some implementations, the ball may be desirably retractable via manipulation of a button on top of the pin so as to inhibit wear on the interface between the ball and the sleeve surface.

Figure 3A:
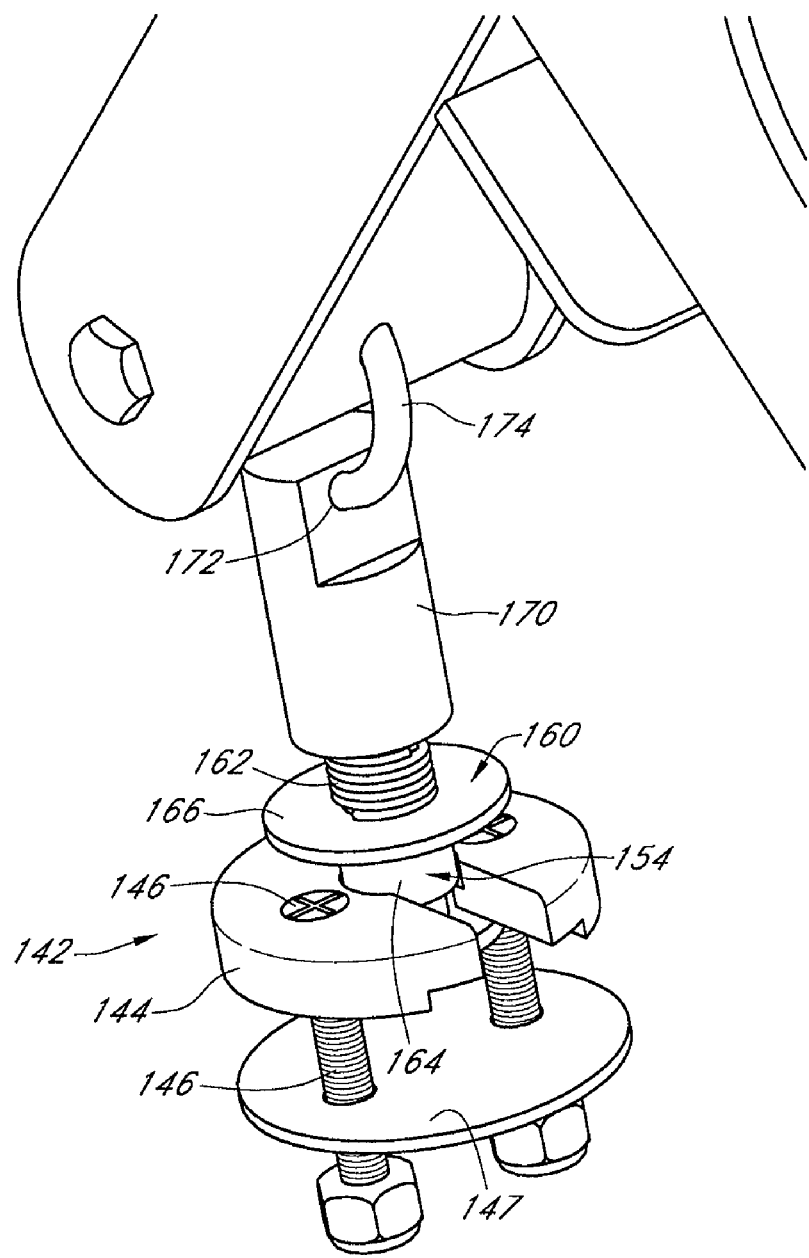
FIGS. 3A-3C are detail views of an anchor member of the securing device of FIG. 1.
Figure 3B:
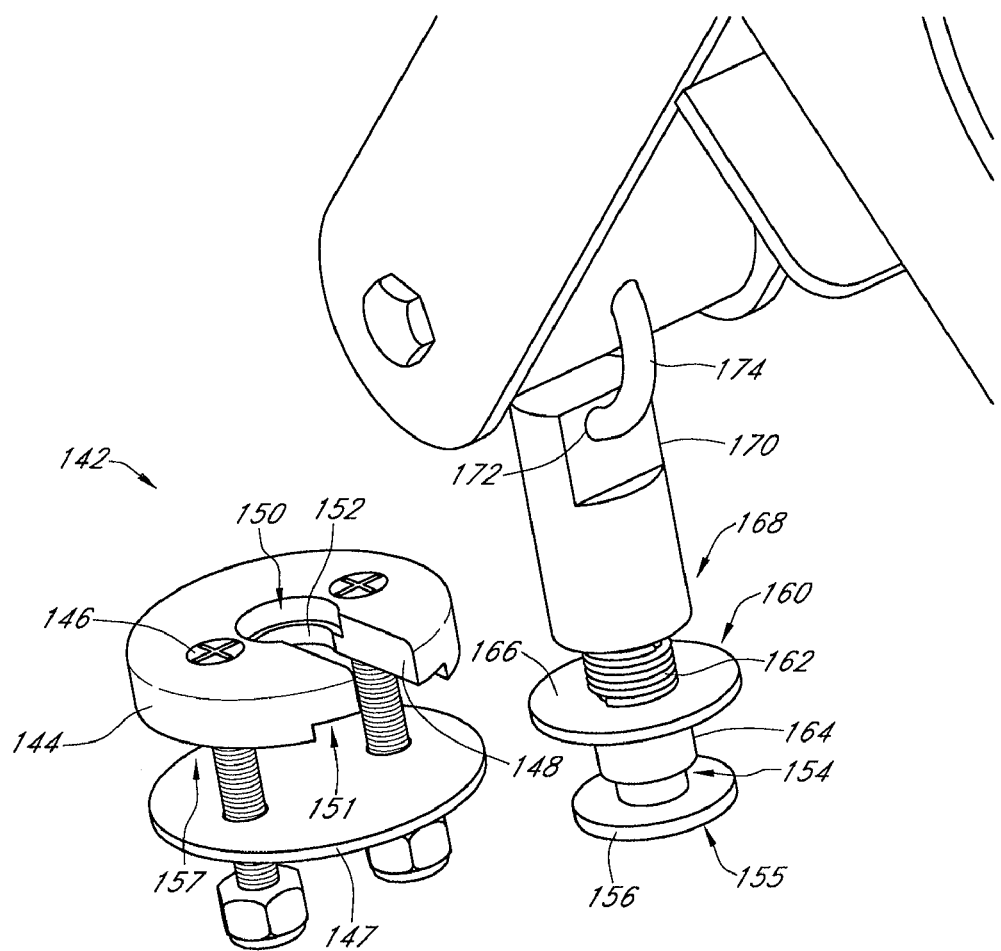

FIGS. 3A and 3B illustrates the anchor assembly 142 of the securing assembly 100 in greater detail. Preferably, the anchor assembly 142 allows for the securing assembly 100 to be detachable from the transport vehicle. Specifically, the anchor assembly 142 includes an anchor plate 144 that mounts to the floor 104 of the transport vehicle via one or more fasteners 146 and a washer 147 mounted on the underside of the floor 104. The anchor plate 144 defines a channel 148 that terminates in a circular recessed area 150. The circular recessed area 150 defines a circular lip 152. The bottom side 149 of the anchor plate 144 further defines a slot 151 that is in communication with and has a greater width than the channel 148.

As illustrated, the anchor plate 144 is generally flat so as to be generally flush with the vehicle surface 104. In this way, mounting the anchor plates 144 to the surface 104 generally results in less obstruction on the surface 104 that would otherwise interfere with other uses of the transport vehicle when motorcycles, quads and the like are not being transported.

As is also illustrated in FIGS. 3A and 3B, the anchor assembly 142 also includes a shaft member 154 that has an end with a lip 156. The lip 156 is preferably dimensioned so as to slide through the slot 151 with the shaft member 154 sliding through the channel 148 in the anchor plate 144 such that the lip 156 is positioned underneath the circular recessed area 150. The lip 156 on the shaft member 154 preferably engages the underside 157 of the anchor member 144 such that the anchor member 144 prevents or otherwise inhibits the shaft member 154 from being removed upward out of the circular recessed area 150 as a result of the circular recessed area 150 having a smaller diameter than the lip 156 of the shaft member 154

As is also illustrated in FIGS. 3A and 3B, the anchor assembly 142 also includes a securing member 160 that is mounted about the shaft member 154 and is biased by a coil spring 162 in the direction of the end having the lip 156. The securing member 160 has a cylindrical shaft portion 164 that is sized so as to extend into the circular recessed area 150 to rest against the upper surface of the circular lip 152. The securing member 160 further includes a flange 166 that extends outward from an upper end 168 of the cylindrical shaft portion 164. The flange 166 is sized so as to generally cover the recessed circular area 150 to inhibit the entry of dirt or debris that could otherwise clog the recessed area 150 or channel 148 making installation and removal of the securing assembly 100 more difficult. The flange 166 further defines a bearing surface upon which the coil spring 162 bears.

Attached to an upper end of the shaft member 154 is a ring member 170. The ring member defines an opening 172 that receives a ring 174 which is then attached to a lower end of the leg member 102. The ring 174 attaches to the leg member 102 in a manner that preferably permits pivoting motion in two directions, lateral with respect to the motorcycle or ATV and along the longitudinal access of the motorcycle or ATV.

Figure 3C:
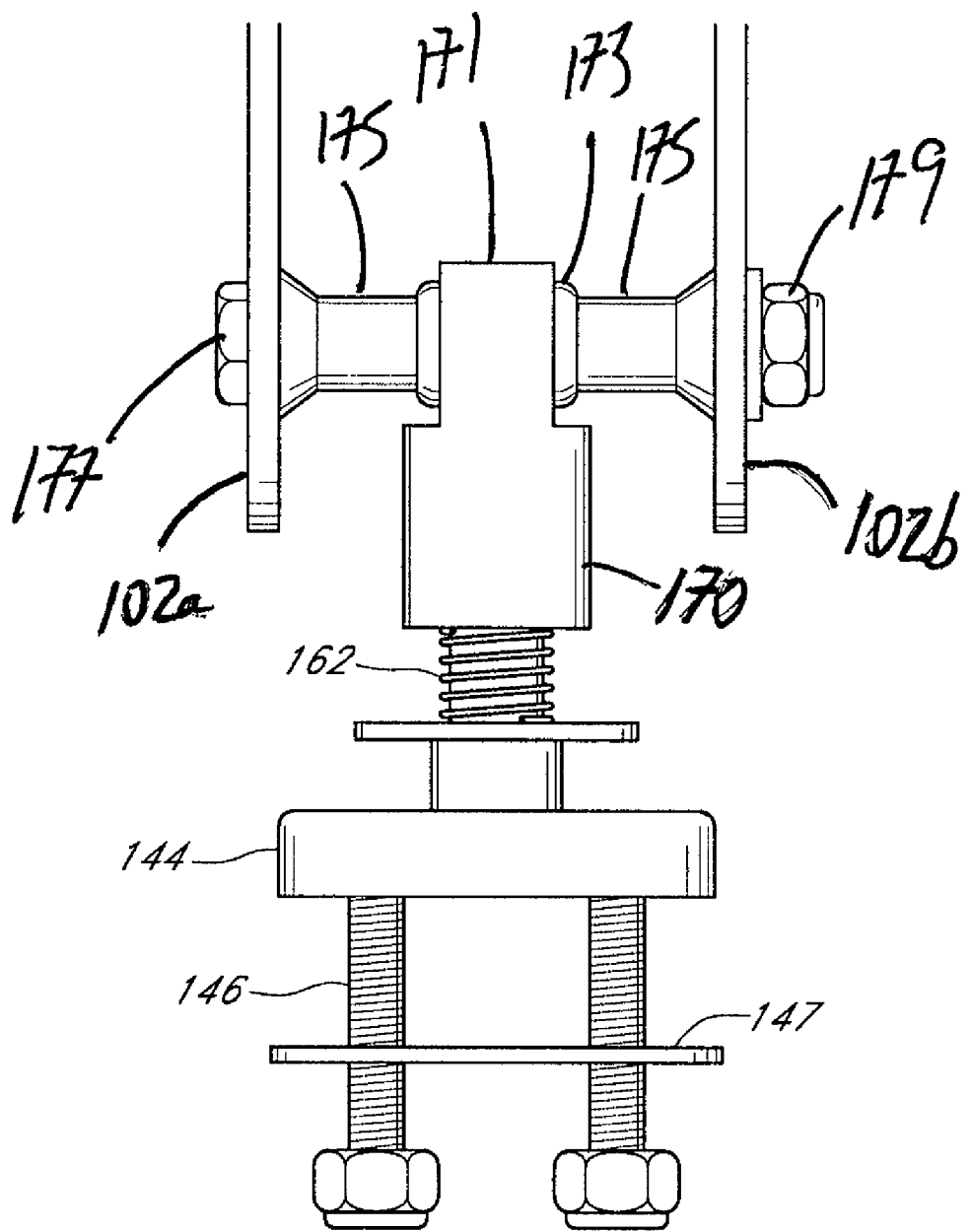

The attachment shown in FIGS. 3A and 3B are one possible way of interconnecting the anchor assembly 142 to the legs 102a, 102b. FIG. 3C illustrates another embodiment of this attachment. In this embodiment, the member 170 has a narrow section 171 with an opening that receives a ball 173. Positioned adjacent either side of the ball 173 so as to be interposed between the ball 173 and the legs 102a, 102b, are two spacers 175. A bolt 177 or other shaft extends through the spacers 175 and the ball 173 so as to define an axis of rotation for the interconnection between the member 170 and the members 102a, 102b. A nut 179 or other such fastening device can then be secured to the bolt 177 or shaft to secure the interconnection. It will be appreciated that any of a number of different pivoting connection can be made without departing from the spirit of the present invention.

To couple the securing assembly 102 to the anchor plate 144, the user pulls the securing member 160 away from the end 155 of the member 154 having the lip 156 thereby allowing the lip 156 to slide down the slot 151 with the member 154 sliding down the channel 148 into the recessed circular area 150. The lip 156 engages with the underside of the anchor member 144 and the user then releases the securing member 160. The spring 162 then urges the securing member 160 into the recessed circular area 150 such that the securing member 160 engages with the upper surface of the circular lip 152 and draws the lip 156 of the member 154 upward into engagement with the underside 157 of the anchor plate 144.

The engagement of the lip 156 and the underside of the anchor member 147 inhibits upward removal of the securing member 160 from the anchor plate 144 and the engagement of the cylindrical portion 164 of the securing member 160 with the recessed circular area 150 of the anchor plate 144 inhibits removal of the shaft member 154 via the channel 148 as the outer diameter of the cylindrical portion 164 is greater than the width of the channel 148.

Thus, the securing assembly 100 can be easily installed onto the anchor plate 144. Removal is also relatively easy as the user simply has to withdraw the cylindrical portion 164 of the securing member 160 from the recessed circular area 150 against the bias of the spring 162 and then slide the shaft member 154 out of the channel 148. This anchor assembly thereby provides a quick connect and disconnect system whereby the securing assembly 100 can be easily installed and removed with only the anchor plate 144 being permanently mounted on the surface 104 of the transport vehicle.

To use the personal motorized vehicles securing assemblies 100, the user first mounts two anchor plates 144 in the transport vehicle. The spacing of the anchor plates 144 will be dependent on whether a motorcycle or ATV is to be secured. The user then couples the securing assembly 100 to the anchor plate 144 in the above-described manner. The user then positions the vehicle in the transport vehicle such that the footpegs are adjacent the sleeves 130 and then pivotally moves the sleeves 130 onto the footpegs 112 with the securing assemblies 100 in the release position (FIG. 4A). Subsequently, the user grasps the handle 122 of the lever member 118 of each of the apparatuses and thereby rotates it upward from the release position shown in FIG. 4A into the secured position shown in FIG. 4B. This results in the personal motorized vehicle 114 being urged downward against the vehicle's shock absorber which thereby more securely positions the vehicle within the transport vehicle. Subsequently, the pins 138 on each of the pin assemblies 136 are positioned through the sleeves 130 and footpegs 112 in the manner described above. Preferably, one of these assemblies 100 is positioned on each of the footpegs 112 of the vehicle 114 such that the vehicle is secure on both sides in the manner shown in FIG. 5. Preferably, the front tire of a motorcycle may also be blocked or otherwise chocked to inhibit movement of the front of the motorcycle with respect to the two securing assemblies 100.

More specifically, in the release position of FIG. 4A, the leg member 102 is pivotable with respect to the anchor assembly 142 about two axes allowing the securing assembly 100 to be moved towards and away from the vehicle 114 and also to be pivoted along the length of the vehicle 114. Further, the lever members 118 are pivotable with respect to the leg members 102 and the arm members 124 are pivotable with respect to the lever members 118. The relative pivotability of each of the components of the assembly 100 allows the user to easily move the assembly 100 so that the sleeve or boot 130 can be positioned onto the footpeg 112.

Preferably, the user positions the sleeve 130 of a first securing assembly 100 onto a first footpeg 112 with the assembly in the release position (FIG. 4A) and then inserts the pin 138 to latch the assembly 100 to the footpeg 112. The user then positions the sleeve 130 of a second securing assembly 100 onto the other footpeg 112 and latches the assembly 100 to the footpeg 112 with the pin 138 of the second securing assembly 100.

When both securing assemblies 100 are coupled to the footpegs 112 of the motorcycle or ATV 114, the user then grasps the lever member 118 of one of the securing assemblies 100 and rotates the lever member 118 upward into the secured position shown in FIG. 4B. This results in the arm member 124 being drawn downward toward the anchor assembly 142 which results in the motorcycle or ATV 114 also being drawn downward towards the floor 104 of the transport vehicle. The user then performs the same action with the other securing assembly 100. The downward force on the motorcycle or ATV 114 compresses the shock absorbers of the motorcycle or ATV and anchors the vehicle to the surface 104. As there are two securing assemblies on either side of the vehicle, lateral movement or back and forth movement of the vehicle is inhibited.

As is illustrated in FIGS. 2 and 4B, a strap or chain 190 may be positioned on the handle 122 of the lever member 118. The strap 190 can preferably be engaged with the pin assembly 136 to inhibit the lever member 118 from clockwise rotation into the released position of FIG. 4A. Moreover, by sizing the lever member 118 and the arm member 124 correctly, the lever member 118 can be biased into the secured position of FIG. 4B to inhibit spontaneous movement of the lever member 118 out of the secured position.

Figure 5:
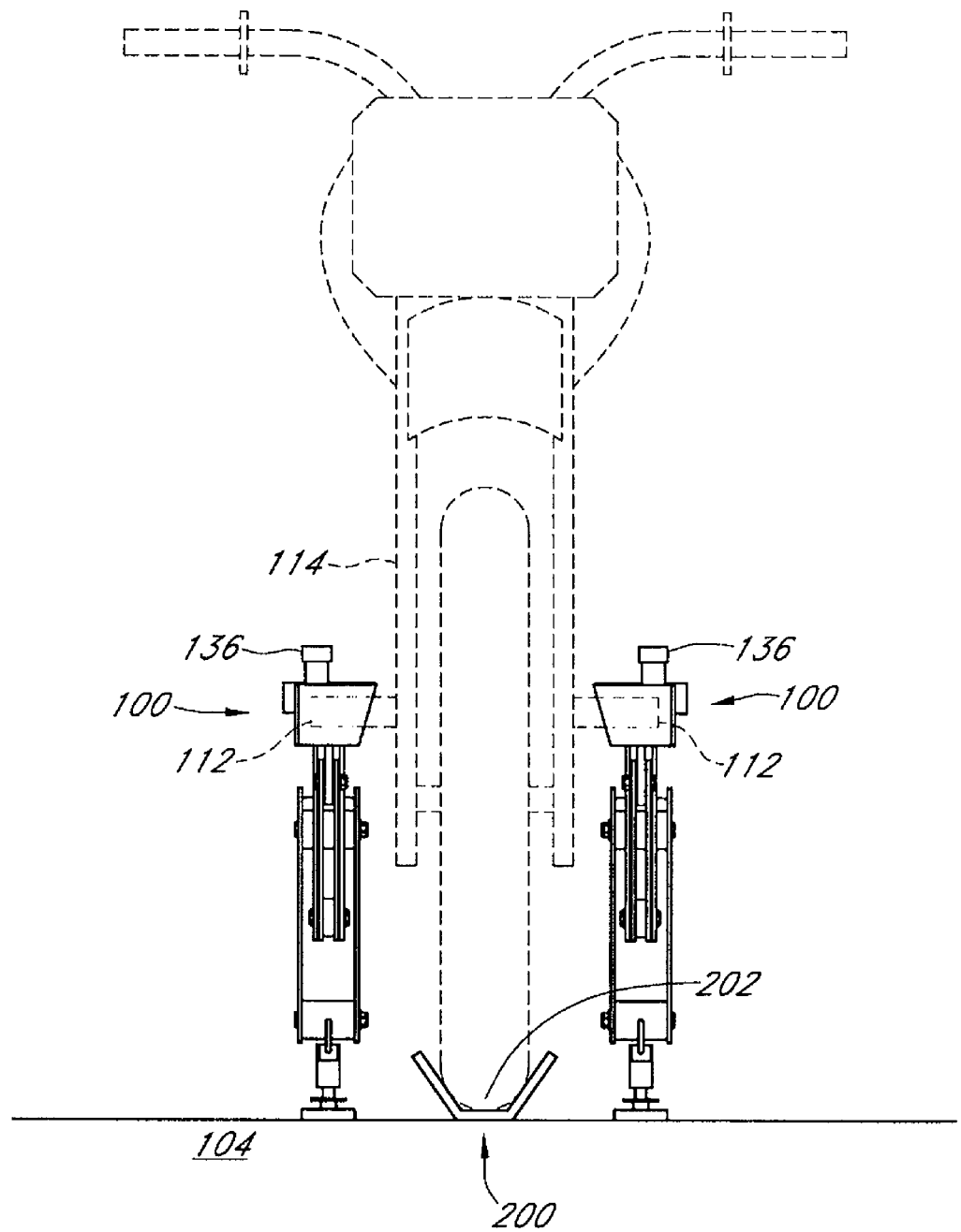
FIG. 5 is a front view of a motorcycle secured to a surface with two of the securing devices of FIG. 1.

As shown in FIG. 5, the two assemblies 100 may be accompanied by a front or rear wheel chock 200. The chock may be mounted to the floor 104 of the transport vehicle in a similar manner as described above with respect to the anchor assembly 142. The chock 200 defines a space 202 that is sized to receive the wheel to thereby prevent the wheel from rotating or moving to thereby further secure the vehicle.

The components of the assembly 100 are preferably formed of a rigid material such as aluminum, steel or heavy duty plastic. The use of rigid components further inhibits lateral movement of the personal motorized vehicle. Moreover, rigid components are easier to tighten than typical tie down straps which further facilitates the ease with which a user can secure their motorcycle or ATV.

The foregoing description has described the securing assembly mainly in conjunction with a motorcycle. However, a person of ordinary skill in the art will realize that this system can be used with any type of personal vehicle that has a footpeg or similar structure without departing from the spirit of the present invention.

Thus, motorcycles, ATVs and like vehicles can be easily secured to a vehicle for transportation and can also be easily removed by simply removing the pins from the sleeves and footpegs and then rotating the lever into the release position thereby sliding the sleeves off of the footpegs. Preferably, the leg members are mounted to the floor of the transport vehicle via a pivoting assembly that can also allow for the legs to be removed such that when motorcycles or ATVs are not being transported the floor is generally unobstructed by the securing assembly.

Although the above disclosed embodiments of the present teachings have shown, described and pointed out the fundamental novel features of the invention as applied to the above-disclosed embodiments, it should be understood that various omissions, substitutions and changes in the form of the detail of the devices, systems and/or methods illustrated may be made by those skilled in the art without departing from the spirit of the present invention or the scope of the present teachings.

What is claimed is:

1. An assembly for securing a personal motorized vehicle having first and second footpegs to a floor of a transport vehicle, the assembly comprising:
    a first securing device that engages with the first footpeg of the personal motorized vehicle, the first securing device being detachably anchored to the floor and having a coupler that couples to the first footpeg, the first securing device further having a first member that is pivotally movable between a first position wherein the first footpeg is urged towards the floor to thereby secure the personal motorized vehicle, and a second position wherein the first footpeg is allowed to move away from the floor to permit removal of the first securing device from the first footpeg; and
    a second securing device that engages with the second footpeg of the personal motorized vehicle, the second securing device being detachable anchored to the floor and having a coupler that couples to the second footpeg, the second securing device further having a second member that is pivotally movable between a first position wherein the second footpeg is urged towards the floor to thereby secure the personal motorized vehicle, and a second position wherein the second footpeg is allowed to move away from the floor to permit removal of the second securing device from the second footpeg.

2. The assembly of claim 1, wherein each of the first and second securing devices include an anchor assembly which comprises an anchor plate that is mountable to the floor of the transport vehicle, and a securing member which can be mounted to or detached from the anchor plate.

3. The assembly of claim 2, wherein the couplers of the first and second securing devices each comprises:
    a boot or sleeve sized to fit around the respective footpeg; and
    a pin assembly comprising a pin that extends through the boot or sleeve to the respective footpeg, so as to secure the boot or sleeve to the respective footpeg.

4. The assembly of claim 2, wherein the first and second securing devices each comprise:
    an arm member pivotally attached to the respective coupler;
    a lever member pivotally attached to the arm member, the lever member extending to a handle; and
    a leg member pivotally connected to the lever member between the arm member and the handle, the leg member being pivotally attached to the securing member of the anchor assembly.

* * * * *